United States Patent

Hain

(10) Patent No.: US 11,728,748 B2
(45) Date of Patent: Aug. 15, 2023

(54) POWER MODULE FOR OPERATING AN ELECTRIC VEHICLE DRIVE WITH IMPROVED TEMPERATURE DETERMINATION OF THE POWER SEMICONDUCTORS

(71) Applicant: ZF Friedrichshafen AG, Friedrichshafen (DE)

(72) Inventor: Stefan Hain, Speichersdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 78 days.

(21) Appl. No.: 17/362,677

(22) Filed: Jun. 29, 2021

(65) Prior Publication Data

US 2021/0408939 A1 Dec. 30, 2021

(30) Foreign Application Priority Data

Jun. 30, 2020 (DE) ...................... 10 2020 208 167.0

(51) Int. Cl.
*H02M 7/539* (2006.01)
*B60L 50/51* (2019.01)

(52) U.S. Cl.
CPC ............. *H02M 7/539* (2013.01); *B60L 50/51* (2019.02); *B60L 2210/40* (2013.01)

(58) Field of Classification Search
None
See application file for complete search history.

(56) References Cited

U.S. PATENT DOCUMENTS

| 2013/0265139 A1* | 10/2013 | Nummila | G06K 19/0723 340/10.1 |
| 2022/0006283 A1* | 1/2022 | Dukaric | H02P 29/68 |

FOREIGN PATENT DOCUMENTS

| DE | 102013219373 | 3/2015 |
| WO | WO2019108219 | 6/2019 |

OTHER PUBLICATIONS

Search Report issued in German Patent Application No. 10 2020 208 167.0 dated Feb. 8, 2021 (10 pages).

* cited by examiner

*Primary Examiner* — Jared Fureman
*Assistant Examiner* — Aqeel H Bukhari
(74) *Attorney, Agent, or Firm* — Crowell & Moring LLP

(57) ABSTRACT

A power module for operating an electric vehicle drive, comprising: numerous power switches, each of which has a power semiconductor; a control electronics for controlling the numerous power switches to generate an output current based on an input current; wherein the control electronics also comprises a temperature unit configured to detect an operating voltage and operating current in the power semiconductor, and determine the temperature of the power semiconductor based on the operating voltage and operating current.

17 Claims, 1 Drawing Sheet

POWER MODULE FOR OPERATING AN ELECTRIC VEHICLE DRIVE WITH IMPROVED TEMPERATURE DETERMINATION OF THE POWER SEMICONDUCTORS

CROSS-REFERENCE TO RELATED APPLICATIONS

This application claims priority from German Application No. DE 10 2020 208 167.0, filed on Jun. 30, 2020, the entirety of which is hereby fully incorporated by reference herein.

TECHNICAL FIELD

The present invention relates to the field of electric mobility, in particular the power modules for operating an electric vehicle drive.

TECHNICAL BACKGROUND

Power modules, in particular integrated power modules, are increasingly used in motor vehicles. These power modules are used, e.g. in DC/AC inverters, which supply a multiphase alternating current to electric motors. A direct current generated by a DC power source, e.g. a battery, is converted for this into a multiphase alternating current. The power modules are based on power semiconductors, in particular transistors such as IGBTs, MOSFETs and HEMTs. Other uses are DC/DC converters and AC/DC converters and transformers.

Power switches used in a bridge circuit are normally formed by the power semiconductors. A common example is the so-called half-bridge, which comprises a high-side component and a low-side component. The high-side and low-side components each comprise one or more power switches, specifically high-side power switches and low-side power switches. Through targeted switching of the high-side and low-side power switches, the direction of the current (output current) generated at the output of the power module can be alternated in very short cycles between a positive current direction and a negative current direction. In the case of a DC/AC inverter this allows for a so-called pulse-width modulation for generating an alternating current based on a direct current supplied to the input of the power module.

In all of these applications it is advantageous when the switching time for the power switch that is used is short enough. Due to the progress made in the field of power semiconductors, short switching times can be obtained using so-called wide bandgap semiconductors (semiconductors with large bandgaps), such as SiC and GaN.

All power semiconductors have a maximum temperatures that cannot be exceeded when in operation without damaging the power semiconductors. When designing power electronics drives, it is therefore important that this maximum temperature is not exceeded in any operating states. Temperature sensors are used for this, for detecting the operating temperatures of the power switches. Negative temperature coefficient (NTC) sensors and positive temperature coefficient (PTC) sensors are known from the prior art. The NTC and PTC sensors are electrical resistors, the resistances of which change with a negative or positive thermal coefficient as a function of the temperature. The temperature in the power semiconductor can then be determined by measuring the electric resistance.

The power modules known from the prior have the disadvantage that the temperature measurement is not sufficiently precise. This imprecision is because the temperature sensors are normally at a distance to the power semiconductors. The measured temperatures frequently deviate significantly from the actual operating temperatures in the power semiconductors, and are therefore not reliable indicators in assessing the functionality of the power semiconductors. It is conceivable to use calculation models to correct for these temperature differences. These calculation models can only help to a certain extent in obtaining a reliable temperature. By way of example, dynamic temperature jumps cannot be detected using these models.

The fundamental object of the invention is therefore to obtain a power module with which the operating temperature of the power semiconductors can be detected with greater precision.

This object is achieved by a power module and a method according to the independent claims.

The power module in the framework of this invention is used to operate an electric drive in a vehicle, in particular an electric vehicle and/or a hybrid vehicle. The power module is preferably used in a DC/AC inverter. In particular, the power module is used to power an electric machine, e.g. an electric motor and/or a generator. A DC/AC inverter is used to generate a multiphase alternating current from a direct current generated from a DC voltage from a power source, e.g. a battery.

The power module has numerous power switches. These semiconductor-based power switches to generate an output current based on the input current by activating the individual power switches. The power switches are controlled by a control electronics that comprises one or more printed circuit boards populated with numerous electronic components. The control electronics preferably comprises a controller component for generating a control signal based on an operating state of the power module and a driver for controlling the power switches based on the control signal. The control can be based on a so-called pulse-width modulation. In the case of an inverter, the input current is a direct current, and the output current is an alternating current.

The numerous power switches preferably form a bridge circuitry, which can comprise one or more bridge circuits (i.e. half-bridges). Each bridge circuit or half-bridge comprises one or more high-side switches (HS switches) connected in parallel, and one or more low-side switches (LS switches) connected in parallel. The HS switch(es) are connected to the LS switch(es) in series. In the case of an inverter, each half-bridge is dedicated to one current phase in the multi-phase alternating current (output current). The HS switch and the LS switch each comprise one or more power semiconductor components, e.g. IGBT, MOSFET, HEMT. The fundamental semiconductor material for the respective power semiconductor component preferably comprises a so-called wide bandgap semiconductor (semiconductor with a wide bandgap), e.g. silicon carbide (SiC) or gallium nitride (GaN), and/or it can comprise silicon.

A heatsink to which the power switches are thermally coupled can be provided for cooling the power switches and other electronic components in the power module.

According to the invention, the control electronics comprises a temperature unit designed to detect an operating voltage and an operating current of the power semiconductor, and determine a temperature of the power semiconductor based on the operating voltage and the operating current. The operating current in the power semiconductor can be detected, for example, through one or more phase current sensors in the power module, or interacting therewith. The operating voltage of the power semiconductor can be tapped into and measured directly at the power semiconductor. Alternatively, the operating voltage of the power semiconductor can be estimated by tapping into a voltage proportional to a voltage drop at the power semiconductor. Alternatively or additionally, the operating voltage and/or operating current can be a value calculated using a calculation model or a simulation.

There is preferably a diode upstream of the power semiconductor functioning as a transistor. The diode is also preferably connected to a side of a drain electrode in the transistor facing away from a source electrode in the transistor. In this case, the temperature unit is preferably designed to detect a diode voltage applied to the diode as the operating voltage. It is understood in the framework of this invention that the diode voltage represents a specific form of the operating voltage in the power semiconductor.

The temperature can be determined in various ways based on the operating voltage and the operating current detected in the power semiconductor. According to one embodiment, the temperature unit is configured to access a calibration database obtained by a pre-characterization of the power semiconductor. The calibration database is preferably a table that contains values for the operating voltage and the operating current in the power semiconductor recorded at numerous temperatures of the power semiconductor, and the values of the associated temperatures of the power semiconductors.

According to another embodiment, the temperature unit is configured to access one or more calibration curves obtained by plotting the operating voltage as a function of the operating current at numerous temperatures of the power semiconductor, and/or by plotting the operating current as a function of the operating voltage at numerous temperatures of the power conductor. In this case, the calibration curve(s) contain one or more I-V curves. The pairs of values for the operating voltage and the operating current can be compared with the I-V curves in order to identify the I-V curve that contains the pair of values.

According to another embodiment, the temperature unit is configured to determine the temperature of the power semiconductor based on the voltage-current pair of values using a mathematical function that describes the behavior of the temperature in relation to the operating voltage and the operating current in the power semiconductor.

Because there is no need for an additional temperature sensor for determining the temperature of the power semiconductor, the power module can be produced inexpensively, with less effort, in a compact form. Furthermore, the disadvantage of the measurement imprecision due to the distances between the temperature sensors and the power semiconductors is entirely eliminated according to the invention. The precision of the temperature of the power semiconductor determined according to the invention is particularly high, because the temperature determination is based on the operating voltage and the operating current in the power semiconductor, which is continuously read out while the power semiconductor is in operation. This enables a continuous temperature measurement of the power semiconductor when it is in operation.

Advantageous embodiments and developments are described in the dependent claims.

Embodiments shall now be described by way of example and in reference to the attached drawings. Therein:

The same reference symbols are used for the same or functionally similar elements in the drawings.

Figure 1:
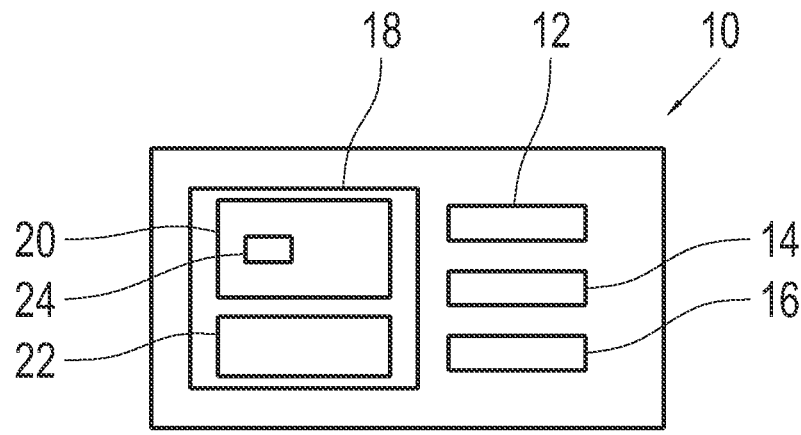
FIG. 1 shows a schematic illustration of a power module according to one embodiment.

FIG. 1 shows a schematic illustration of a power module 10 according to one embodiment. The power module comprises numerous power switches 12, 14, 16, each containing a power semiconductor. The power semiconductors can be silicon, or a so-called wide-bandgap semiconductor (semiconductor with a wide bandgap), such as silicon carbide (SiC) or gallium nitride (GaN). The power module 10 comprises a control electronics 18 for controlling the power switches 12, 14, 16. The control electronics 18 contains a controller component 20 and a driver 22. The controller component 20 detects an operating state of the power module and/or the electric vehicle drive and generates a control signal on the basis thereof. The driver 22 controls the power switch based on the control signal, i.e. a gate voltage, drain voltage, source voltage, drain-source current, and/or source-drain current are determined in the power switch that is to be controlled.

The illustration of the power module 10 is simplified in FIG. 1. In general, the power module 10 preferably comprises a current input for an input current obtained from an input-side power source (e.g. a power battery), a current output for outputting an output current based on the input current, generated by means of the power switches 12, 14, 16 controlled by the control electronics 18. If the power module 10 is used for an inverter, an AC multiphase output current is generated, preferably by means of a pulse-width modulation of the power switches 12, 14, 16, based on a DC input current.

The power module 10 can also contain a DC link capacitor for smoothing the input voltage, and a heatsink for discharging heat when the power switch 12, 14, 16 is in operation. The power switches 12, 14, 16 can be attached to the heatsink via an insulation layer, i.e. a direct bonded copper (DBC) layer, comprising two copper layers and an insulation layer sandwiched between them.

There is also a temperature unit 24 in the control electronics 180, in particular in the controller component 20. The temperature unit 24 is used to detect an operating voltage and an operating current in the power semiconductor for one or more, or all, of the power switches 12, 14, 16. The temperature unit 24 can determine a temperature of the power semiconductor based on the operating voltage and the operating current.

Figure 2:
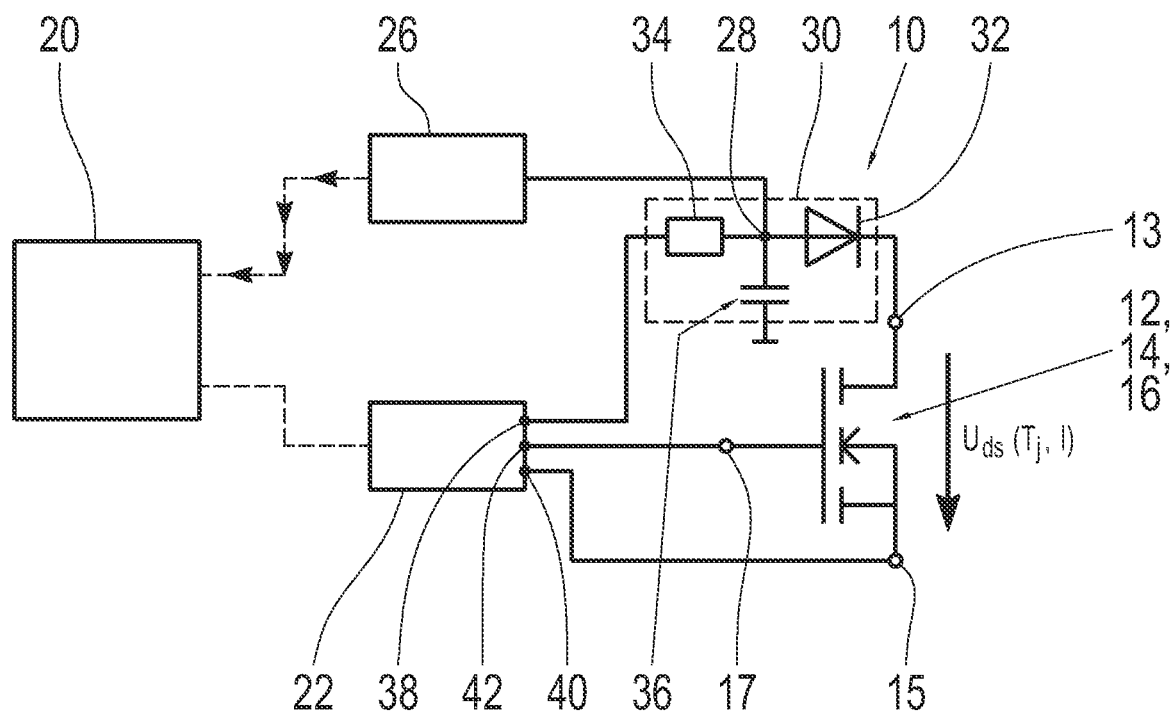
FIG. 2 shows a schematic illustration of a circuitry in the power module in FIG. 1.

FIG. 2 shows a schematic illustration of a circuitry for the power module 10 in FIG. 1. For purposes of simplification, only one power switch 12, 14, 16 is shown herein, which is in the form of a transistor (i.e. IGBT, MOSFET, HEMT). The transistor comprises a drain electrode 13, a source electrode 15, and a gate electrode 17. These three electrodes are each connected to a connection 38, 40, 42 on the driver 22 via a signal line. The driver 22 connected to the controller component 20, with which the driver 22 forms the control electronics 18.

There is a voltage measurement unit 26 in the power module 10 for determining the operating voltage of the power semiconductor. The operating voltage of the power semiconductor can be a drain-source voltage $U_{ds}$, which can be tapped into directly in the form of a voltage drop at the power semiconductor. In the embodiment shown in FIG. 2, however, the operating voltage is a diode voltage $U_d$ measured by the voltage measurement unit 26, wherein the electrical potential that is tapped into lies at a point 28 on a cathode in a diode 32 facing away from an anode in the diode 32, which is upstream of the power switches 12, 14, 16. In particular, the diode 32 is located on a side of the drain electrode 13 facing away from the source electrode 15. The diode voltage $U_d$ is proportional to the drain-source voltage $U_{ds}$. The diode 32 is preferably a decoupling diode for decoupling a high voltage at the power semiconductor. If the transistor is operated in its conducting phase, there is a high voltage at the power semiconductor. The high voltage is decoupled by means of the diode 32 to prevent damaging the driver 22 or the control electronics 18 with the high voltage.

The decoupling diode 32 can be located in a short circuit detection device 30, as shown in FIG. 2 by way of example, also comprising an RC link composed of an electric resistor 34 and a capacitor 36. Alternatively, the decoupling diode 32 can be integrated in an active damping unit, preferably in the form of a Zener diode.

The drain-source voltage $U_{ds}$ depends on the operating current I, in particular the drain-source current $I_{ds}$, and the operating temperature $T_j$ in the power semiconductor. The temperature in the power semiconductor, when in operation, can be determined in a number of ways based on the detected operating voltage and operating current of the power semiconductor. According to one embodiment, the temperature unit 24 is configured to access a calibration database obtained by a pre-characterization of the power semiconductor. The calibration database is preferably a table that contains values for the operating voltage and the operating current in the power semiconductor recorded at numerous temperatures of the power semiconductor, and the values of the associated temperatures of the power semiconductors.

According to another embodiment, the temperature unit 24 is configured to access one or more calibration curves obtained by plotting the operating voltage as a function of the operating current at numerous temperatures of the power semiconductor, and/or by plotting the operating current as a function of the operating voltage at numerous temperatures of the power conductor. In this case, the calibration curve(s) contain one or more I-V curves. The pairs of values for the operating voltage and the operating current can be compared with the I-V curves in order to identify the I-V curve that contains the pair of values.

According to another embodiment, the temperature unit 24 is configured to determine the temperature of the power semiconductor based on the voltage-current pair of values using a mathematical function that describes the behavior of the temperature in relation to the operating voltage and the operating current in the power semiconductor.

Figure 3:
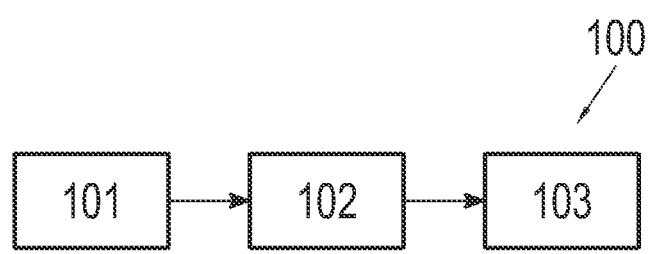
FIG. 3 shows a schematic illustration of a method according to one embodiment.

FIG. 3 shows a schematic illustration of a method 100 for determining a temperature in the power module 10. In a first step 101 in the method 100, an operating voltage and an operating current are detected in the power semiconductor by the temperature unit 24 in the control electronics 18. In a second step 102 in the method 100, the temperature of the power semiconductor is determined based on the operating voltage and the operating current.

REFERENCE SYMBOLS

10 power module
12, 14, 16 power switches
13 drain electrode
15 source electrode
17 gate electrode
18 control electronics
20 controller component
22 driver
24 temperature unit
26 voltage measurement unit
28 point
30 short circuit detection device
32 diode
34 resistor
36 capacitor
38 40, 32 connections
100 method
101-103 steps

The invention claimed is:

1. A power module for operating an electric vehicle drive, comprising:
  a plurality of power switches, each of which has a power semiconductor; and
  control electronics configured to control the plurality of power switches to generate an output current based on an input current;
  wherein the control electronics also comprises a temperature unit configured to detect an operating voltage and operating current in the power semiconductor, and determine the temperature of the power semiconductor based on the operating voltage and operating current, and
  wherein a diode is connected to a side of a drain electrode in the power semiconductor facing away from a source electrode in the power semiconductor, wherein the temperature unit is configured to detect a diode voltage applied to the diode as the operating voltage of the power semiconductor.

2. The power module according to claim 1, wherein the power semiconductors of the plurality of power switches function as transistors, wherein the operating voltage comprises a drain-source voltage in the power semiconductor.

3. The power module according to claim 2, wherein the temperature unit is configured to determine the temperature of the power semiconductor by means of a calibration database.

4. The power module according to claim 2, wherein the diode voltage is tapped into on a side of an anode in the diode facing away from a cathode in the diode.

5. The power module according to claim 2, wherein the diode forms a decoupling diode for decoupling a high voltage at the power semiconductor.

6. The power module according to claim 2, wherein the diode is located in at least one of a short circuit detection unit or an active clamping unit in the power module.

7. The power module according to claim 2, wherein the power semiconductor functions as a transistor, and wherein the operating current comprises a positive drain-source current in the power semiconductor.

8. The power module according to claim 2, wherein the control electronics comprises:
  a controller component for generating a control signal based on an operating state of at least one of the power module or the electric vehicle drive, and
  a driver for controlling the power switches based on the control signal,
  wherein the temperature unit is located in the controller component in the control electronics.

9. The power module according to claim 1, wherein the diode voltage is tapped into on a side of an anode in the diode facing away from a cathode in the diode.

10. The power module according to claim 9, wherein the temperature unit is configured to determine the temperature of the power semiconductor by means of a calibration database.

11. The power module according to claim 1, wherein the diode forms a decoupling diode for decoupling a high voltage at the power semiconductor.

12. The power module according to claim 1, wherein the diode is located in at least one of a short circuit detection unit or an active clamping unit in the power module.

13. The power module according to claim 1, wherein the power semiconductor functions as a transistor, and wherein the operating current comprises a positive drain-source current in the power semiconductor.

14. The power module according to claim 1, wherein the control electronics comprises:
- a controller component for generating a control signal based on an operating state of at least one of the power module or the electric vehicle drive, and
- a driver for controlling the power switches based on the control signal,
  wherein the temperature unit is located in the controller component in the control electronics.

15. A method for determining a temperature in a power module comprising a plurality of power switches, each of which has a power semiconductor, and a control electronics for controlling the numerous power switches, to generate an output current based on an input current, wherein the method comprises:

- detecting, by a temperature unit of the control electronics, an operating voltage and an operating current in the power semiconductor;
- determining, by the control electronics, the temperature of the power semiconductor based on the operating voltage and operating current; and
- detecting, by the temperature unit, a diode voltage applied to a diode as the operating voltage of the power semiconductor, wherein the diode is connected to a side of a drain electrode in the power semiconductor facing away from a source electrode in the power semiconductor.

16. The method according claim 15, further comprising:
- determining, by the temperature unit, the temperature of the power semiconductor by means of a calibration database.

17. The method according claim 15, further comprising:
- generating, by a controller component of the control electronics, a control signal based on an operating state of at least one of the power module or the electric vehicle drive; and
- controlling, by a driver of the control electronics, the power switches based on the control signal,
- wherein the temperature unit is located in the controller component in the control electronics.

* * * * *